United States Patent [19]

Uhl

[11] Patent Number: 5,751,417
[45] Date of Patent: May 12, 1998

[54] ARRANGEMENT FOR CONFOCAL FLUORESCENCE MICROSCOPY

[76] Inventor: Rainer Uhl, Bahnhofstrasse 89, Grifelfing, Germany

[21] Appl. No.: 619,922

[22] Filed: Mar. 20, 1996

[30] Foreign Application Priority Data

Mar. 20, 1995 [DE] Germany ................. 195 10 102.2

[51] Int. Cl.$^6$ ................................................. G01N 21/64
[52] U.S. Cl. ............................... 356/318; 250/458.1
[58] Field of Search ........................... 356/317, 318; 250/458.1, 459.1, 461.1, 461.2

[56] References Cited

U.S. PATENT DOCUMENTS

| | | |
|---|---|---|
| 4,863,226 | 9/1989 | Houpt et al. |
| 5,192,980 | 3/1993 | Dixon et al. ............... 356/318 |
| 5,283,433 | 2/1994 | Tsien . |

FOREIGN PATENT DOCUMENTS

WO 95/07488  3/1995  WIPO .

*Primary Examiner*—F. L. Evans
*Attorney, Agent, or Firm*—Sixbey, Friedman Leedom & Ferguson; David S. Safran

[57] ABSTRACT

An arrangement for confocal or quasifocal fluorescence microscopy is suggested in which, in an image beam path, there are arranged in succession, an objective arrangement for acquiring an image of a specimen to be examined, at least one scanner mirror located downstream of the objective arrangement, a tube lens, a confocal first strip diaphragm, a first spectrometer arrangement, a wavelength selection diaphragm for selection of the emission wavelength, a second spectrometer arrangement which is analogous to the first spectrometer arrangement, and a detector for acquiring the brightness distribution. In which, by means of the wavelength selection diaphragm, coupling of excitation light takes place by the reflecting back of an excitation beam path to the wavelength selection diaphragm from a source of monochromatic excitation light by a strip diaphragm which corresponds to the confocal strip diaphragm and a third spectrometer arrangement which is analogous to the first spectrometer arrangement. The image beam path and excitation beam path are constituted and matched to one another such that the light emitted from the specimen reaches the detector by way of the wavelength selection diaphragm. Excitation light from the wavelength selection diaphragm, however, is prevented from hitting the detector, but traverses the confocal strip diaphragm.

22 Claims, 4 Drawing Sheets

ARRANGEMENT FOR CONFOCAL FLUORESCENCE MICROSCOPY

BACKGROUND OF THE INVENTION

1. Field of the Invention

This invention relates generally to confocal fluorescence microscopy, and more particularly to an arrangement for a confocal fluorescence microscope with slit-like diaphragms which allow excitation and emission wavelengths to be selected and combined freely and independently of one another.

2. Description of Related Art

In conventional confocal fluorescence microscopy, a specimen is illuminated point-by-point by an objective lens. (The point size measured at an Airy disk is less than one micron.) The emission light emerging from the illuminated point is collected by the same objective lens, passes through a selection diaphragm which is conjugate to the original illumination diaphragm and eliminates scattered light from all other regions of the specimen. The emission light finally is detected by a photomultiplier. By scanning the illuminated point in the object plane, a 2-D image can be sequentially determined. Additional shifting of the objective in the z-direction allows a 3-D image to be reconstructed. The fact that only the directly illuminated point contributes to image information is a guarantee of a resolution higher than that of conventional recording methods, and it enables 3-D resolution by topographical means.

In real time imaging, such as with video frames, at the desired resolution of, for example, 480×640 points per pixel, only an exposure time of 100 ns per point is available. A measurable signal can only be achieved with strong lasers when the excitation light source has this exposure time. The main disadvantage of this approach is that only a few laser wavelengths are available and rapid switching between wavelengths is difficult. If the intention is, therefore, to use a white light source, such as a xenon lamp, instead of a laser source, with sequential scanning, unacceptably long scan times would result which can be significantly accelerated only by parallel excitation and parallel registration. This parallel scanning is done in the arrangement of Petran (D. Egger and M. Petran, 1967, *Science* 157, pp. 305–307 and M. Petran et al. 1968, *J. Opt. Soc. Am.* 58, pp. 661–664). A so-called Nipkow disc to which a spiral hole pattern grid is applied turns rapidly around its axis, and thus, sequentially illuminates all points of the object. Conjugated points on the same disk then scan the image; for which reason, the resulting microscope has been called a tandem scanning microscope. The mechanical requirements for the precision of the disk and disk movement are, however, so enormous and calibration is so delicate that this principle has not become popular in practice.

A more practical and, thus, more successful version of the Petran principle was developed by Xiao and Kino (G. Q. Xiao and G. S. Kino, 1987, *Proc. SPIE* 809, pp. 107–113). In the process called RSOM (real time scanning optical microscope), excitation and emission beams pass through the same pinholes. This requires specially developed Nipkow disks with extremely low reflection and use of crossed polarizers and a ¼ plate to eliminate disruptive returned reflections. The requirements on the disk are thus somewhat reduced, but are still very high.

Both of these arrangements deliver quasi-parallel image information that can be registered with the naked eye or a surface sensor, such as a CCD chip. A new, more elegant version of quasi-parallel recording was introduced by Brakenhoff et al. (G. J. Brakenhoff and K. Visscher, 1992, *J. Microscopy* 165, p. 139–146). In this case, a stationary point grid is imaged onto the object via a scan mirror which can move in two axes. Tilting of the mirror in two orthogonal directions moves the point grid over the object and thus "scans" it. The emitted light is then returned to the same mirror, separated from the excitation light by a dichroic filter and passed through an diaphragm grid analogous to the excitation diaphragm grid. Light which passes through this diaphragm is then deflected such that it is incident on the mirrored back of the scan mirror; this leads to the image being descanned, i.e., in the image plane, blanketing images occur in succession when the specimen is blanket-illuminated in succession. The Brakenhoff arrangement produces clean, bright images and is most useful when a series of parallel slits, which need only be scanned in one direction, is satisfactory.

All prior art require a dichroic beam splitter to separate the excitation and emission light. In "multicolor images", i.e., when specimens marked with several fluorophores are to be measured, several images must be recorded in succession at different excitation or emission wavelengths and then projected on top of one another. To do this, the dichroic beam splitter had to be changed between the images; this can only be done with difficulty or there will be noticeable beam offset in diffraction-limited imaging.

The prior art has failed, therefore, to provide an arrangement for confocal fluorescence microscopy that allows excitation and emission wavelengths to be freely and independently selected and combined with one another. A need exists for an arrangement that allows such independent wavelengths and does not require a dichroic beam splitter.

SUMMARY OF INVENTION

It is a primary object of the present invention, therefore, to overcome the deficiencies of the prior art and to provide an arrangement for confocal fluorescence microscopy that allows excitation and emission wavelengths to be freely and independently selected and combined with each other.

It is another object of the present invention to devise an arrangement for confocal fluorescence microscopy which does not require a dichroic beam splitter.

It is a further object of the present invention to devise and arrangement for confocal fluorescence microscopy which may accomplish a multiple-wavelength excitation or emission protocol in fluorescence and can also obtain monochrome and color (RGB) transmitted light photographs.

The present invention provides an arrangement for confocal or quasifocal fluorescence microscopy in which, in an image beam path, the following are arranged in succession:

(1) an objective arrangement for recording an image of a specimen to be examined;

(2) at least one scanner mirror located downstream of the objective arrangement;

(3) a tube lens for producing an image of the specimen in an image plane;

(4) a confocal first strip diaphragm located in the image plane of the tube lens;

(5) a first spectrometer arrangement with
   (i) a first lens for imaging the slit of the first strip diaphragm at infinity,
   (ii) a dispersion prism for spectral decomposition of the light emerging from the first lens, and
   (iii) second lens for producing an image in an exit slit plane of the first spectrometer arrangement which represents an intermediate image plane;

(6) a wavelength selection diaphragm located in the exit slit plane with a host of parallel slits, with a slit width (slit spacing) which corresponds to the desired bandwidth and corresponds to the spacing of the above strip diagram which can be shifted perpendicularly to the longitudinal direction of the slit for purposes of selection of the emission wavelength;

(7) a second spectrometer arrangement which is analogous to the first spectrometer arrangement and which is operated in subtractive dispersion in order to spectrally re-combine the light of the wavelength selection diaphragm which has been spectrally fanned out and to image it in a second image plane; and (8) a detector for acquiring the brightness distribution in the second image plane.

By means of the wavelength selection diaphragm, coupling of the excitation light takes place through the return of an excitation beam along the same path into the system, which consists of the first spectrometer arrangement, the confocal first strip diaphragm, the tube lens, the scanner mirror and the objective arrangement. The excitation beam travels from a source for monochromatic excitation light, by way of a second strip diaphragm, corresponding to the confocal first strip diaphragm; and a third spectrometer arrangement, analogous to the first spectrometer arrangement, to the wavelength selection diaphragm, in which the image beam path and excitation beam path are constituted and matched to one another, such that the light emitted from the specimen reaches the detector via the wavelength selection diaphragm. Excitation light from the wavelength selection diaphragm is prevented, however, from hitting the detector but traverses the confocal first strip diaphragm and reaches the specimen.

Preferably, the arrangement is designed as a confocal fluorescence microscope with a specimen to be examined, a monochromatic excitation light source, a first and a second strip diaphragm, a first prism spectrometer, an identical second prism spectrometer, analogous to the first prism spectrometer, a third prism spectrometer and a detector for the fluorescent light emitted from the specimen. The excitation light is incident on a scanner mirror and then on the specimen through an objective arrangement that focuses on the specimen. The emitted light reaches the detector through the objective arrangement and by means of the scanner mirror. The first and the third prism spectrometers are located in the excitation light path in which the third prism spectrometer follows the second strip diaphragm which consists of a host of parallel slits. Following the excitation beam, the first prism spectrometer precedes the first strip diaphragm, located confocally to the object plane. It is identical to the second strip diaphragm. The third prism spectrometer fans out the excitation light emerging from the second strip diaphragm and focusses it in an intermediate image plane. From the intermediate image plane, the fanned-out excitation light is incident on the first prism spectrometer and is recombined by the latter, in the plane of the first strip diaphragm. The first prism spectrometer fans out the fluorescent light emerging from the first strip diaphragm in the detector direction and focuses it in the intermediate image plane. From the intermediate image plane, the fanned-out fluorescent light is incident on the second prism spectrometer, which is identical to the first and third prism spectrometer, and is concentrated by the second prism spectrometer and focused on the detector. In the intermediate image plane, there is a selection diaphragm which separates the fluorescent light from the excitation light. To do this, the selection diaphragm is formed as a strip diaphragm with a host of parallel slits and reflecting surfaces in between the parallel slits. The host of parallel slits are aligned parallel to the slits of the first and second strip diaphragm and are adapted to them in position and dimensions, such that either the reflecting surfaces surrounding the slits reflect the excitation light to the specimen and the emitted light is incident in a straight line through the slits of the selection diaphragm on the detector or, conversely, that the excitation light is incident in a straight line through the slits of the selection diaphragm on the specimen and the reflective surfaces reflect the fluorescent light to the detector. The selection diaphragm can be moved for purposes of adjustment to a desired fluorescent wavelength perpendicular to the longitudinal direction of its slits.

The present invention has the significant advantage that a dichroic beam splitter is now unnecessary. Dichroic beam splitters conventionally must be replaced if the excitation wavelength is to be changed, i.e., when the wavelength emitted by the monochromatic excitation light source is changed, for example, by corresponding triggering of a monochromator equipped with a white light source, preferably a monochromator of the type described in German Patent 42 28 366 A. In this case, the advantage of a white light source over a laser (that any number of excitation wavelengths can be accomplished without high cost) can be properly used. A free choice of excitation and emission wavelength and the rapid, independent changing of the wavelengths are now possible.

This is especially important when "multicolor images" are desired, i.e., when specimens which are marked with several fluorochromes are to be measured. In this case, several sequential pictures must be recorded at different excitation wavelengths and later projected on top of one another. Since, in the present invention, the measurement configuration need not be modified for changing between the excitation wavelengths, there is no beam offset between the individual images. Furthermore, the luminance which can be attained with the white light sources is sufficient so that any number of excitation wavelengths can be accomplished without great cost. In addition, the present invention allows both excitation and emission wavelength scanning as well as transmitted light images both in monochrome and in color.

When the detector is designed as a area sensor, the arrangement can be further provided with a descanner mirror which moves analogously to the scanner mirror and which images the emitted light strips in time and space coordination to the excitation of the specimen on the detector.

Another possible use of the present invention as an area imager is to build the detector as a multiline sensor, to read out the lines again after each shift of the scanner mirror, and then reconstruct mathematically the 2D image information. Since this method saves a mechanically moved part and synchronization of its movement with that of the scanner mirror, it can be regarded as more elegant and practical. Furthermore, it should be mentioned that an area sensor can also be used by a suitable electronic readout protocol like a "multi-line sensor".

In order to achieve an optimum confocal effect, instead of the confocal strip diaphragm, there can be a confocal point diaphragm with additional scanner and descanner arrangements being present for scanning or descanning in a direction which runs orthogonal to the scanning direction of the scanner mirror. As an alternative, a point diaphragm which can move parallel to the strip direction of the wavelength selection diaphragm can be provided in the excitation beam path, instead of the strip diaphragm. In this case, an arrangement which evaluates only the image information which corresponds to the point grid of the point diaphragm can be assigned to the detector, by which distortions due to excitation light which has been reflected back are minimized.

An additional source can be provided for white observation light in order to illuminate the specimen alternatively in a transmitted light process.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

To simplify the description, the measurement principle is explained using an arrangement for confocal fluorescence microscopy with slit-like diaphragms and a one-dimensional scan direction.

Figure 1:
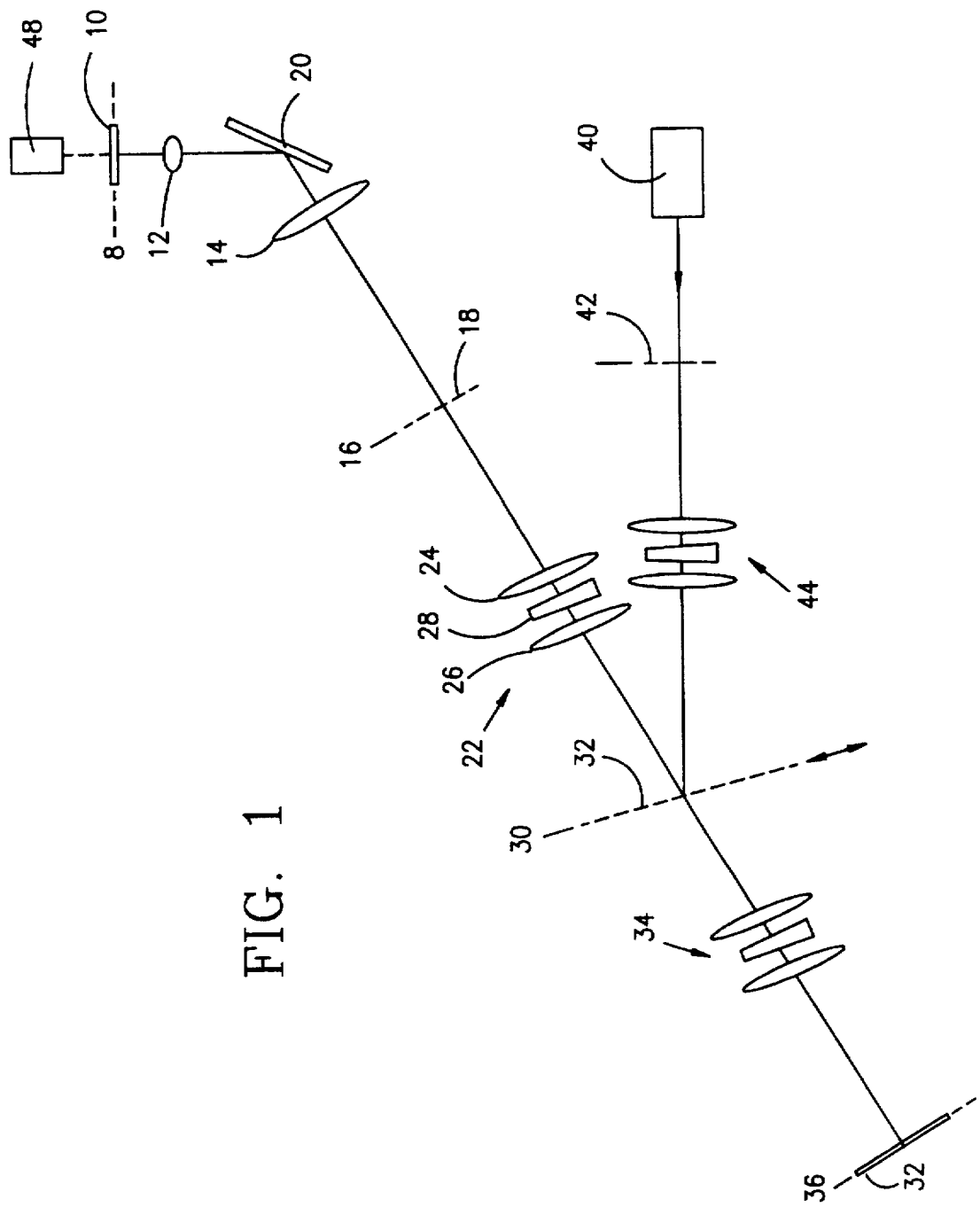
FIG. 1 diagrammatically depicts an arrangement for confocal fluorescence microscopy according to a first embodiment of the present invention.

With reference to FIG. 1, a specimen 10, inserted into an object plane 8, is imaged at infinity by means of an objective arrangement 12 which has either an infinitely corrected objective or an objective and a corresponding Telan lens. Specimen 10 is imaged in an image plane 16 by means of tube lens 14. In the image plane 16 of the tube lens 14, there is a confocal strip diaphragm 18 which has, for example, 32 parallel, strip-shaped openings. The horizontal dimension of the strip corresponds to the desired image width, for example, 200 microns in the specimen plane, and the vertical extension corresponds to a diffraction-limited strip, for example, 0.4 micron. The distance between the parallel strips is selected such that the amounts of scattered light from adjacent strips can be ignored. In the example shown, this distance is sixteen times the slit thickness. Between the objective arrangement 12 and the tube lens 14, there is a scanner mirror 20 mounted on a scanner; its operation is described below.

Image plane 16 with the strip diaphragm 18 located therein forms an entrance slit plane of a first spectrometer arrangement 22. First spectrometer arrangement 22 has two diffraction-limited achromatic lenses 24, 26 as the imaging element and a refraction prism 28 with an extremely low dispersion as the dispersing element. Dispersion is selected such that a specimen which shines white and is inserted into object plane 8 would yield a series of "spectrally blurred" strips in which the spectra do not overlap in the intermediate image plane or exit slit plane 30 of the first spectrometer arrangement 22. In the exit slit plane 30, there is a wavelength selection diaphragm 32. Diaphragm 32 is mirrored on its side which faces the first spectrometer arrangement 22 and it similarly has 32 slits corresponding to confocal strip diaphragm 18. Wavelength selection diaphragm 32 can be shifted by means of a piezocrystal (not shown) in a direction perpendicular to the slits, so that the slits pass only a desired wavelength range. By means of a second spectrometer arrangement 34, which has subtractive dispersion and which is complementary to first spectrometer arrangement 22, wavelength-selected light which has been transmitted through the slit of wavelength selection diaphragm 32 in image plane 36 is combined again into a sequence of diffraction-limited slits with a brightness distribution which can be measured using detector 38. By means of a suitable mechanical descan process, 2D intensity profiles can be produced and recorded with area sensors. If detector 38 is made as a multi-line sensor, descanning takes place electronically, i.e., in the computer. To do this, after each movement of the scanner mirror all lines are exposed and read out again. Then the 2D image is reconstructed from the lines which have been read out in succession.

For excitation of the specimen which is located in object plane 8, excitation light is coupled by wavelength selection diaphragm 32. The excitation light is produced by a monochromatic light source 40. A monochromator arrangement equipped with a white light source as is known from German Patent 42 28 366 A1 is preferable for this purpose, but a looser arrangement could be used likewise. One such monochromator arrangement easily makes it possible to adjust the wavelength of the monochromatic excitation light to the desired length. Using monochromatic light, strip diaphragm 42, which is identical to strip diaphragm 18, is illuminated. Since an example of a diaphragm of 32 slits was selected for strip diaphragm 18, strip diaphragm 42 also produces 32 parallel, rectangular, monochromatic light strips which are refracted by means of third spectrometer arrangement 44, analogous to two spectrometer arrangements 22, 34 already described, and projected into image plane 30.

The mirrored surfaces of wavelength selection diaphragm 32 located in image plane 30 reflect the light strips emerging from strip diaphragm 42 and pass backwards through first spectrometer arrangement 22, cancelling the refraction caused by third spectrometer arrangement 44, i.e., they are refracted back. After passing through confocal strip diaphragm 18 and tube lens 14, the excitation light strips are projected onto specimen 10 by objective arrangement 12 as a monochromatic light pattern. In doing so, rotary scanner mirror 20 allows the strip pattern to travel over specimen 10 and thus scan the image.

Careful calibration of strip diaphragm 42 relative to confocal strip diaphragm 18 ensures that all excitation light passes through diaphragm 18 and reaches specimen 10. At the same time, this means that no excitation light is reflected back and distorts the weak emission lines of specimen 10.

Figure 2:
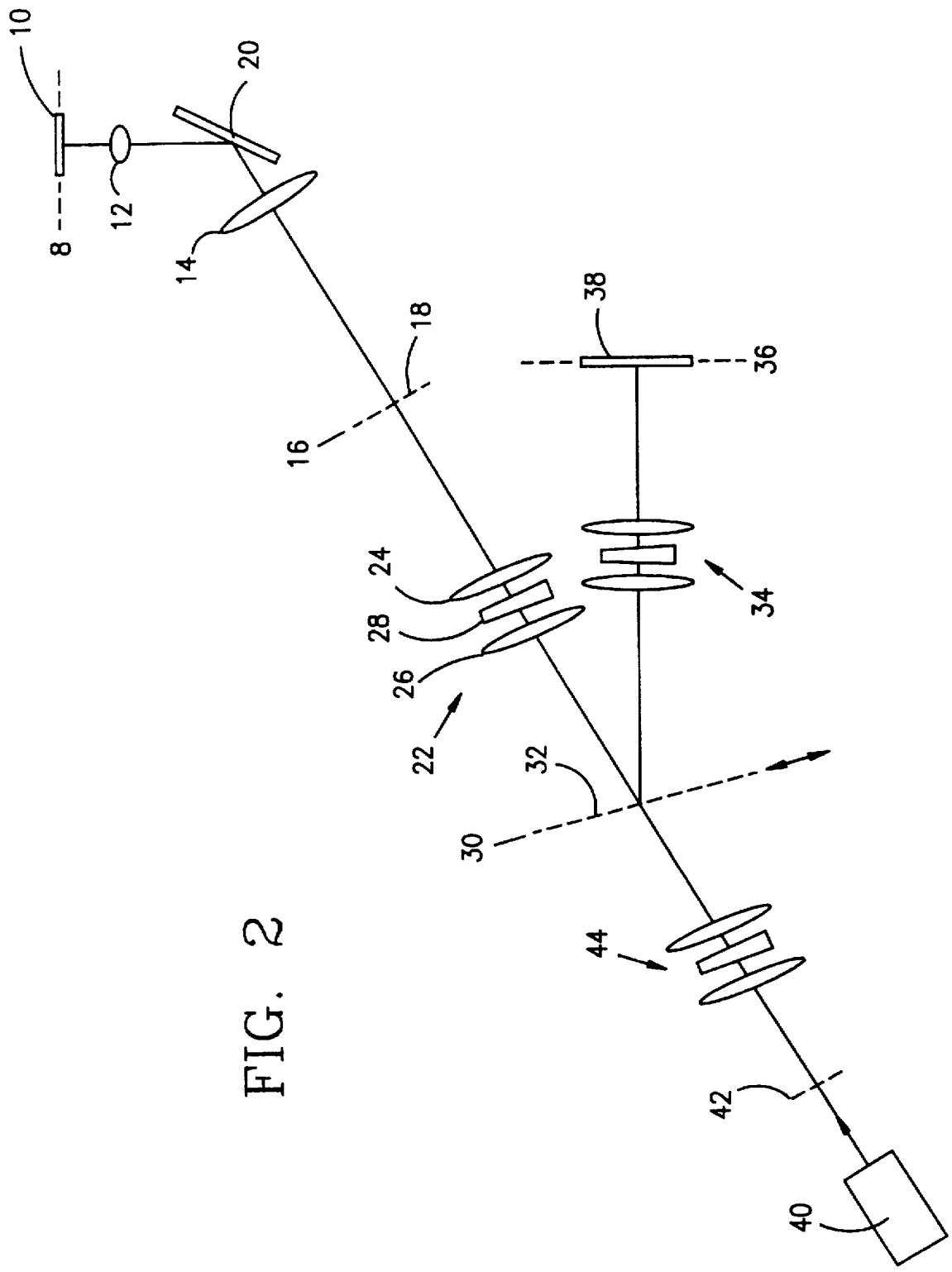
FIG. 2 diagrammatically depicts an arrangement for confocal fluorescence microscopy according to a second embodiment of the present invention.

FIG. 2 shows the second embodiment of the present invention. The elements used in this embodiment are, except for wavelength selection diaphragm 32, all identical to those which were used in the first embodiment. In this embodiment, however, coupling of the excitation light does not take place by means of the reflecting cross-pieces of wavelength selection diaphragm 32, but by means of the non-mirrored slits. For this reason, wavelength selection diaphragm 32 is designed to be complementary to that of the first embodiment, i.e., instead of slit openings, mirrored strips are provided and instead of mirrored strips, slit openings are provided. Whether the first or second embodiment is selected depends on how disruptions, which are caused by excitation light reflected back and which depending on the selected embodiment are much less than in known configurations, can be minimized.

Figure 3:
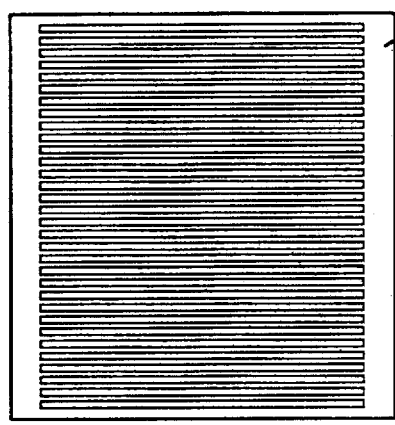
FIG. 3 shows a strip diaphragm for use with the arrangements shown in FIGS. 1 and 2.
Figure 4:
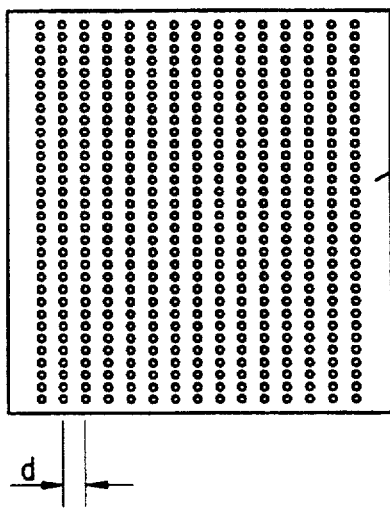
FIG. 4 shows a point diaphragm for use with either embodiment of the present invention.

If the described arrangement is to be refitted onto a device with optimum confocal action, the strip diaphragm 18 (FIG. 3) is replaced by a point diaphragm (FIG. 4). In this case, optimum confocality should arise at relatively small point intervals d. A system with point grid requires a second scan direction orthogonal to the first scan direction, i.e., to the scan direction of scanner mirror 20. It is preferably done by shifting objective arrangement 12 using a piezocrystal. It would also be possible to move the specimen itself, i.e., by means of a piezocrystal, in a second scan direction. On the receiver side, there is a corresponding possibility for descanning of the image.

Alternatively, in the excitation beam path, instead of strip diaphragm 42, there can be a point diaphragm which can move parallel to the wavelength selection diaphragm. The confocal suppression of light from "undesirable" regions then takes place, preferably without descanning on the line sensor or area sensor, which is read out again after each displacement of the point diaphragm. Only the image information which corresponds to the point grid is evaluated. In this approach, diaphragms 18 and 32 can, furthermore, be made as strip diaphragms without loss of quality; this drastically simplifies the conversion from strip to point illumination. This embodiment is not only the most convenient to implement, but it is also the one which promises the least distortion from excitation light which has been reflected back.

Figure 5:
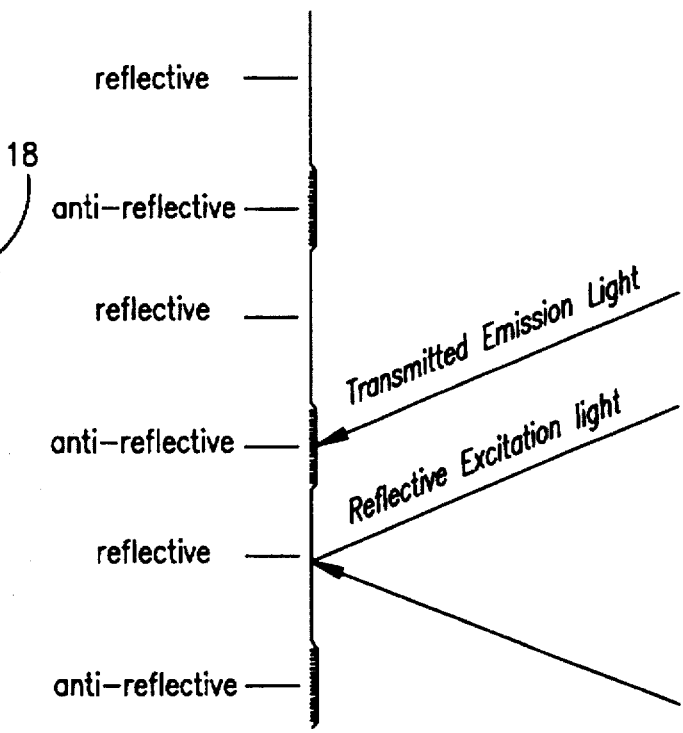
FIG. 5 shows a sectional view of a wavelength selection diaphragm for use with the first embodiment of the present invention.
Figure 6:
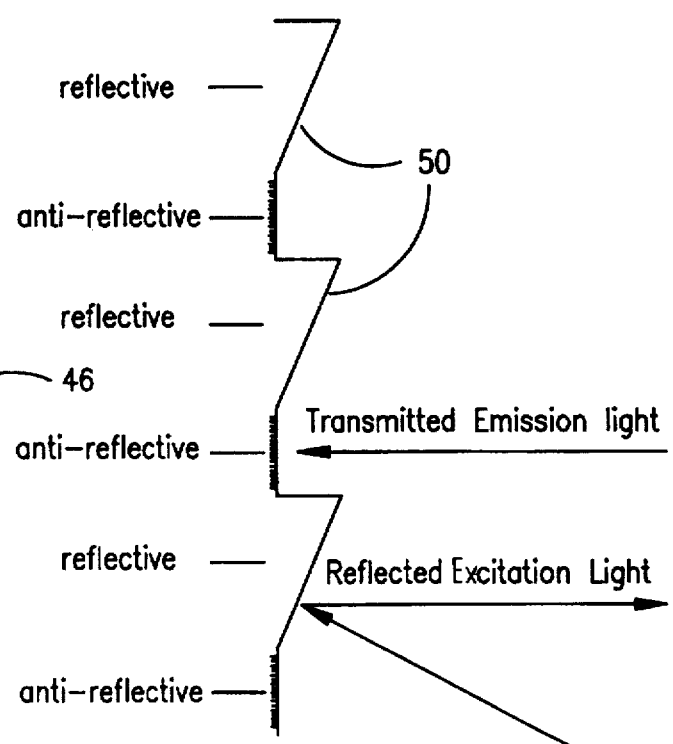
FIG. 6 shows a detailed view of a modified wavelength selection diaphragm for use with the first embodiment of the present invention.

In order to be able to couple the excitation light reflected back into the measurement beam, wavelength selection diaphragm 32 should not be aligned perpendicularly to the beam direction, but must be tilted to an angle of a small degree. For this reason, the lenses must also be tilted by a corresponding angle; under certain circumstances, this adversely affects the imaging properties of the lenses. If we refrain from tilting of the lenses, a likewise tilted image appears in the object plane with, however, a tilt angle which is reduced by the magnification of the objective. In most cases, this should not play a role. If the intention is to prevent this, instead of a planar wavelength selection diaphragm (FIG. 5), a sawtooth wavelength selection diaphragm (FIG. 6), can be selected. In the wavelength selection diaphragm shown in FIG. 6, reflecting cross-pieces 50 are beveled such that for a beam path according to FIG. 1 with a arrangement of the diaphragm perpendicular to the beam path, the emission light is incident perpendicularly on the slit and the excitation light reflected from cross-pieces 50 is aligned parallel to the emission light.

In the embodiment according to FIG. 2, an analog wavelength selection diaphragm can be used. In this case, the excitation light is incident perpendicularly on the slit and is transmitted while the emission light emerging from specimen 10 is reflected from bevelled cross-pieces 50 in the direction to detector 38.

The most elegant version of the wavelength selection diaphragm comprises a so-called digital mirror device (DMD). This is structured analogously to a CCD sensor, i.e., it consists of several hundred thousand reflecting pixels which can be triggered individually by electronics and thus tilted. When this element is used in the present invention, the best separation of excitation and emission light is ensured.

As described above, by shifting in the z-direction, i.e., in the direction parallel to that of the beam path, either the objective arrangement or the specimen itself, a 3D image can be reconstructed. In this case, the detector arrangement must be designed such that it sequentially processes the image information acquired between movements of the objective arrangement or the specimen in the z-direction.

It is, furthermore, noteworthy that the suggested arrangement can also be used in transmitted light. Referring to FIG. 1, again, additional source 48 for white observation light is provided for this purpose. The light which proceeds from source 48 and which illuminates the specimen is spectrally decomposed by first spectrometer arrangement 22. Even color (RGB) images can be recorded by shifting the wavelength selection diaphragm 32 three times.

In one simplified version of the beam path, the confocal strip diaphragm 18 is abandoned and first dispersion prism 28 is placed between objective 12 and tube lens 14. The three optical elements, objective, dispersion prism and tube lens, thus form the first spectrometer arrangement. Confocality in this case is achieved by wavelength selection diaphragm 32 in combination with strip or point selection in detector plane 38, since only light which proceeds from the desired location, supplied with excitation light, with the desired wavelength is incident on the stipulated line in the detector plane. This simplified arrangement, however, only works when there is no mechanical descanning.

It should also be mentioned that the possibility of separation or combination of excitation and emission light shown in the invention can also be used in 2-photon fluorescent microscopy, where longer-wave length excitation light, instead of shorter-wave length, must be separated from the emitted beam.

Figure 7:
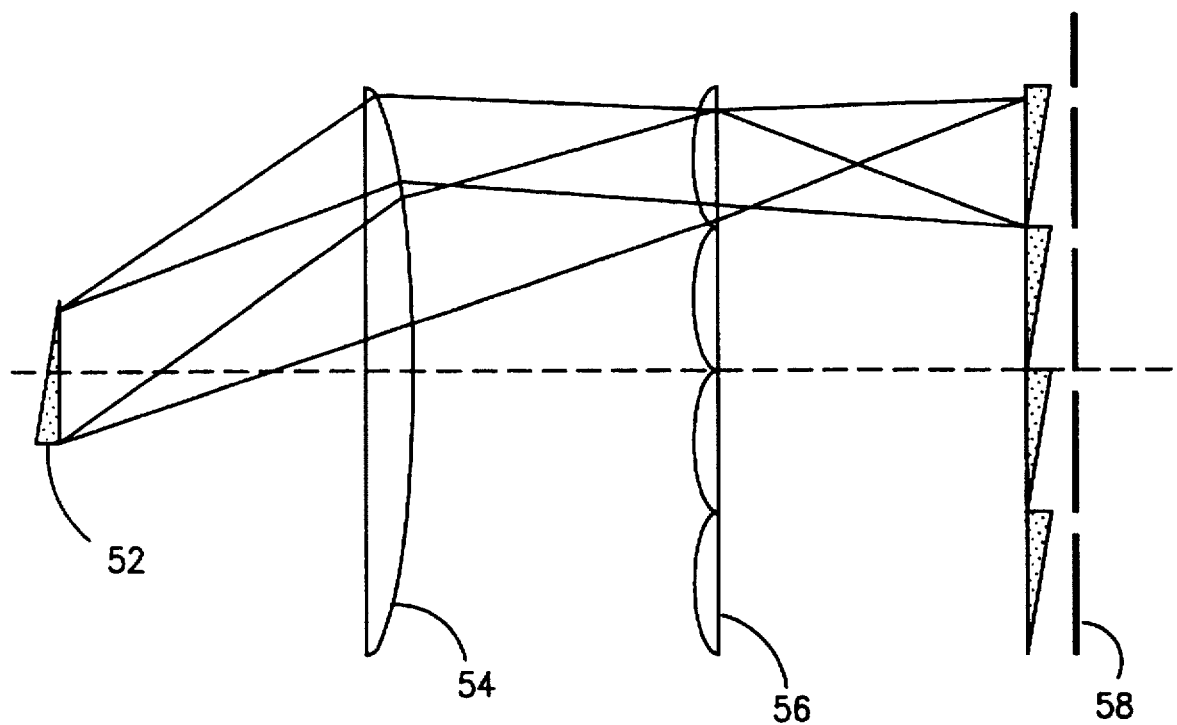
FIG. 7 is a schematic view of a cylinder lens array as is used according to the present invention to provide for optimum use of the intensity of an arc lamp as an excitation light source.

For optimum use of an arc lamp's intensity, which is used as a monochromator arrangement's white light source for the selection of the wavelength of the monochromatic excitation light, the extreme different brightness distribution of the arc lamp must be accounted for. For this reason, monochromatic excitation light source 40, in addition to the means which are used to choose the wavelength of the excitation light, has an arrangement of the type, shown in FIG. 7, which makes it possible to image the brightness distribution of the arc lamp, shown schematically at 52, repeatedly onto strip diaphragm 58 of the monochromator arrangement which corresponds to strip diaphragm 42. This can be done, for example, using lens 54 and cylinder lens array 56 which has as many elements as strip diaphragm 42 has slits. In this way, the hot spots of the lamp, i.e., the locations with the greatest intensity, can be projected into the respective slit plane.

Various changes and modifications to the preferred embodiments herein chosen for purpose of illustration may occur to those skilled in the art. To the extent that such variations and modifications do not depart from the spirit of the invention, they are intended to be included within the scope thereof which is assessed only by fair interpretation of the following claims.

INDUSTRIAL APPLICABILITY

The confocal fluorescence microscope of the present invention will find its primary application where independent selection and combination of excitation and emission wavelengths is desired and in arrangements in which the use of a dichroic beam splitter is not desired.

I claim:

1. An arrangement for confocal and quasifocal fluorescence microscopy in which the following are arranged in succession in an image beam path:

(a) an objective arrangement for acquiring an image of a specimen to be examined;

(b) at least one scanner mirror located below said objective arrangement;

(c) a tube lens for producing an image of said specimen in an image plane;

(d) a first confocal diaphragm located in said image plane of said tube lens;

(e) a first spectrometer arrangement with
   (i) a first lens for imaging an opening of said diaphragm at infinity,
   (ii) a dispersion prism for spectral decomposition of light emerging from said first lens, and
   (iii) a second lens for producing an image in an exit slit plane of said first spectrometer arrangement which represents an intermediate image plane;

(f) a wavelength selection diaphragm located in said exit slit plane with a host of parallel slits with a slit width or spacing which corresponds to a desired bandwidth and which can be shifted perpendicularly to a longitudinal direction of the slits for purposes of selection of an emission wavelength;

(g) a second spectrometer arrangement which is analogous to said first spectrometer arrangement and which forms a subtractive dispersion means to spectrally re-combine the light of said wavelength selection diaphragm which has been spectrally fanned out and to image it in a second image plane; and (h) a detector for acquiring a brightness distribution in said second image plane;

wherein said wavelength selection diaphragm constitutes a means for coupling of excitation light by an excitation beam path travelling back along an arrangement comprised of said first spectrometer arrangement, said first confocal diaphragm, said tube lens, said scanner mirror and said objective arrangement; wherein the excitation beam path leads from a source of monochromatic excitation light by way of a second confocal diaphragm, which corresponds to said first confocal diaphragm, and a third spectrometer arrangement, analogous to said first spectrometer arrangement, to said wavelength selection diaphragm; wherein the image beam path and the excitation beam path are constituted and matched to one another in a manner causing the light emitted from said specimen to reach said detector by way of said wavelength selection diaphragm, and conversely, preventing excitation light from said wavelength selection diaphragm from hitting said detector and causing the excitation light to traverse said first confocal diaphragm and reach said specimen.

2. An arrangement for confocal and quasifocal fluorescence microscopy as described in claim 1, wherein said first confocal diaphragm is a confocal strip diaphragm having a plurality of slits in a plane.

3. An arrangement for confocal and quasifocal fluorescence microscopy as described in claim 2, wherein said arrangement further comprises a monochromator with an adjustable wavelength as a source for the monochromatic excitation light.

4. An arrangement for confocal and quasifocal fluorescence microscopy as described in claim 3, wherein said monochromator has a white light source and means for selection of spectral components of the light emitted by said white light source for use as said excitation light.

5. An arrangement for confocal and quasifocal fluorescence microscopy as described in claim 4, wherein an arc lamp which produces an arc is provided as said white light source and a lens array for using an area of maximum brightness of the arc is assigned to said monochromator.

6. An arrangement for confocal and quasifocal fluorescence microscopy as described in claim 2, wherein a digital mirror device is used as said wavelength selection diaphragm.

7. An arrangement for confocal and quasifocal fluorescence microscopy as described in claim 2, wherein said arrangement further comprises a descanner mirror which is moved analogously to said scanner mirror and which images light strips emitted from the confocal strip diaphragm in time and space coordination with the excitation of said specimen on said detector; and wherein said detector is an area sensor.

8. An arrangement for confocal and quasifocal fluorescence microscopy as described in claim 2, wherein said detector is designed as a multi-line sensor and an arrangement for descanning of the acquired image information electronically is provided.

9. An arrangement for confocal and quasifocal fluorescence microscopy as described in claim 1, wherein said confocal diaphragms are confocal point diaphragms and wherein there are additional scanner and descanner arrangements for scanning and descanning in a direction which runs orthogonally to a scanning direction of said scanner mirror.

10. An arrangement for confocal and quasifocal fluorescence microscopy as described in claim 9, wherein said additional scanner arrangement has a piezocrystal for displacement of said objective arrangement.

11. An arrangement for confocal or quasifocal fluorescence microscopy as described in claim 1, wherein the second confocal diaphragm in the excitation beam path is a point diaphragm which can move parallel to the longitudinal direction of the slits of said wavelength selection diaphragm.

12. An arrangement for confocal or quasifocal fluorescence microscopy as described in claim 11, wherein an arrangement which evaluates only the image information which corresponds to the point grid of said point diaphragm can be assigned to said detector.

13. An arrangement for confocal and quasifocal fluorescence microscopy as described in claim 2, wherein said arrangement further comprises an additional source for white observation light to alternatively illuminate said specimen in a transmitted light process.

14. An arrangement for confocal and quasifocal fluorescence microscopy as described in claim 2, wherein reflecting cross-pieces of said wavelength selection diaphragm are sloped relative to the plane of the slits of the confocal strip diaphragm.

15. An arrangement for confocal and quasifocal fluorescence microscopy in which the following are arranged in succession in an image beam path:

(a) an objective arrangement for acquiring an image of a specimen to be examined;

(b) at least one scanner mirror located below said objective arrangement;

(c) a dispersion prism for spectral decomposition of the light emerging from said objective arrangement;

(d) a tube lens for producing an image in an intermediate image plane of a first spectrometer arrangement which comprises said objective arrangement, said dispersion prism and said tube lens;

(e) a wavelength selection diaphragm located in said intermediate image plane with a host of parallel slits with a slit or slit spacing which corresponds to the desired bandwidth and which can be shifted perpendicularly to the longitudinal direction of the slits for purposes of selection of the emission wavelength;

(f) a second spectrometer arrangement which is analogous to said first spectrometer arrangement and which forms a subtractive dispersion means to spectrally re-combine the light of said wavelength selection diaphragm which has been spectrally fanned out and to image it in a second image plane; and (g) a detector for acquiring the brightness distribution in said second image plane;

wherein said wavelength selection diaphragm forms a means for coupling of excitation light by an excitation beam path travelling back along an arrangement which is comprised of said first spectrometer arrangement and said scanner mirror; the excitation beam path leading from a source for monochromatic excitation light by way of a confocal diaphragm and a third spectrometer arrangement to said wavelength selection diaphragm; wherein the image beam path and excitation beam path are constituted and matched to one another in a manner causing the light emitted from said specimen to reach said detector by way of said wavelength selection diaphragm and conversely for preventing excitation light from said wavelength selection diaphragm from hitting said detector, and causing the excitation light to traverse said confocal diaphragm and reach said specimen.

16. An arrangement for confocal and quasifocal fluorescence microscopy as described in claim 15, wherein said confocal diaphragm is a confocal strip diaphragm.

17. An arrangement for confocal and quasifocal fluorescence microscopy as described in claim 16, wherein said arrangement further comprises a monochromator with adjustable wavelength as the source for monochromatic excitation light.

18. An arrangement for confocal and quasifocal fluorescence microscopy as described in claim 17, wherein said monochromator has a white light source and means for selection of the spectral components of the light emitted by said white light source which are used as excitation light.

19. An arrangement for confocal and quasifocal fluorescence microscopy as described in claim 15, wherein the confocal diaphragm in the excitation beam path is a point diaphragm which is movable parallel to the longitudinal direction of the slits of said wavelength selection diaphragm.

20. A confocal fluorescence microscope with a specimen to be examined, a monochromatic excitation light source, a first and a second strip diaphragm, a first prism spectrometer, a second prism spectrometer which is analogous to said first prism spectrometer, a third prism spectrometer and a detector for the fluorescent light emitted from said specimen; the excitation light being incident on a scanner mirror and from there on said specimen through an objective arrangement with focus on said specimen and the fluorescent light of said specimen in a reverse direction reaching said detector through said objective arrangement by means of said scanner mirror, in which said first and said third prism spectrometers are attached in an excitation light path; said third prism spectrometer following said second strip diaphragm with a host of parallel slits; and said first prism spectrometer being followed by said first strip diaphragm which is located confocally to said objective arrangement and which is identical to said second strip diaphragm; said third prism spectrometer forming a means for fanning out the excitation light emerging from said second strip diaphragm and focusing it in an intermediate image plane, from where the fanned-out excitation light is incident in said first prism spectrometer, is concentrated by the latter, and is focussed on said first strip diaphragm; said first prism spectrometer forming a means for fanning out the fluorescent light emerging from said first strip diaphragm in said detector direction and focusing it in said intermediate image plane from where the fanned-out fluorescent light is incident in said second prism spectrometer and said third prism spectrometer and is concentrated by said second prism spectrometer and is focussed on said detector; wherein a selection diaphragm which separates the fluorescent light from the excitation light is provided in said intermediate image plane and is formed as a strip diaphragm with a host of parallel slits, with reflecting cross-pieces in between said parallel slits, and which are aligned parallel to said slits of said first and said second strip diaphragm and which are dimensionally configured and positionally arranged with respect to them, such that either said cross-pieces reflect the excitation light to said specimen and the fluorescent light is incident in a straight line through said slits of said selection diaphragm on said detector, or conversely the excitation light is incident in a straight line through said slits of said selection diaphragm on said specimen and said cross-pieces reflect the fluorescent light towards said detector; and wherein said selection diaphragm is movable for purposes of adjustment to a desired fluorescent wavelength perpendicularly to the longitudinal direction of said slits.

21. A confocal fluorescence microscope as described in claim 20, wherein said microscope further comprises a monochromator with an adjustable wavelength as the source for monochromatic excitation light.

22. A confocal fluorescence microscope as described in claim 21, wherein said monochromator has a white light source and means for selection of the spectral components of the light emitted by said white light source which are used as excitation light.

* * * * *

UNITED STATES PATENT AND TRADEMARK OFFICE
CERTIFICATE OF CORRECTION

PATENT NO. : 5,751,417
DATED : May 12, 1998
INVENTOR(S) : ARRANGEMENT FOR CONFOCAL FLUORESCENCE MICROSCOPY

It is certified that error appears in the above-identified patent and that said Letters Patent is hereby corrected as shown below:

On the front page of the patent correct the spelling of the city to read --Gräfelfing--

Signed and Sealed this

Ninth Day of February, 1999

Attest:

Attesting Officer

Acting Commissioner of Patents and Trademarks